US005367632A

United States Patent [19]

Bowen et al.

[11] Patent Number: 5,367,632

[45] Date of Patent: Nov. 22, 1994

[54] FLEXIBLE MEMORY CONTROLLER FOR GRAPHICS APPLICATIONS

[75] Inventors: Andrew D. Bowen, Saugerties; David C. Tannenbaum, Hurley, both of N.Y.

[73] Assignee: International Business Machines Corporation, Armonk, N.Y.

[21] Appl. No.: 969,634

[22] Filed: Oct. 30, 1992

[51] Int. Cl.[5] .......... G06F 15/62

[52] U.S. Cl. .......... 395/164; 395/162; 345/186

[58] Field of Search .......... 395/118, 109, 119, 150, 395/127, 151, 140-143, 157, 162-166, 425; 365/230.05, 230.03, 189.01, 189.04; 345/185, 186, 189, 191, 201, 119, 120, 112, 150

[56] References Cited

U.S. PATENT DOCUMENTS

| | | | |
|---|---|---|---|
| 4,725,831 | 2/1988 | Coleman | 395/141 |
| 4,862,392 | 8/1989 | Steiner | 395/164 |
| 4,967,392 | 10/1990 | Werner et al. | 395/275 |
| 5,001,672 | 3/1991 | Ebbers et al. | 365/230.05 |
| 5,065,368 | 11/1991 | Gupta et al. | 365/230.05 |
| 5,115,402 | 5/1992 | Matsushiro et al. | 395/141 |
| 5,185,599 | 2/1993 | Doornink et al. | 395/143 |

*Primary Examiner*—Dale M. Shaw
*Assistant Examiner*—Kee M. Tung
*Attorney, Agent, or Firm*—Mark S. Walker

[57] ABSTRACT

An implementation of a flexible memory controller for a graphics hardware system that supports flexible allocation of frame buffer resources. The buffer selection and steering to the channels of the modification logic are performed by a programmable controller. Furthermore, the controller is capable of performing pixel functions that require multiple frame buffer accesses per pixel. Still further, independent control is provided for read and write sequences. Also, separate control is provided for buffer selection and bus steering. This function is useful for controlling systems where the frame buffer resources are limited. The present invention allows for assigning various buffers alternate functions based on the application's requirements, and may vary on a per window basis.

15 Claims, 10 Drawing Sheets

FLEXIBLE MEMORY CONTROLLER FOR GRAPHICS APPLICATIONS

BACKGROUND OF THE INVENTION

1. Field of the Invention

The present invention relates in general to information handling systems and, more particularly, to hardware logic and processing methods for enhanced data manipulation within a raster graphics display system. Still more particularly, the present invention relates to a system in which the memory controller within a raster graphics display system is highly flexible and allows for dynamic definition of the contents of the associated frame buffers on a per pixel basis.

2. Background and Related Art

Computer graphics display systems, e.g., CAD/CAM graphics workstations, are widely used to generate and display two-dimensional (2D) representations of three-dimensional (3D) objects for scientific, engineering, manufacturing and other applications. Typically, a graphics display system is subdivided into a geometry processor subsystem and a rasterization subsystem which are interconnected such that commands and data are processed through the subsystems in a pipeline manner. Ever present demands for higher quality rendering and more complicated images continually require greater computational flexibility of such systems.

However, these requirements for more and more frame buffer resources force the price of graphics systems ever higher. A typical application may require over 100 bits of data per pixel. More problematically, different applications may require different types of bit planes; one application, for example, may require multiple sets of overlay planes, while another application may require fill control planes for controlling area fills of polygons. To provide a number of dedicated bit planes sufficient for every application would require an unacceptably large number of bit planes.

SUMMARY OF THE INVENTION

It is therefore an object of this invention to provide a method and apparatus in which the limited bit planes in a frame buffer can be managed and allocated selectively on a per window basis to maximize the available function while minimizing the memory requirement for the frame buffer.

It is another object of this invention to provide a method and apparatus for the control of accesses made to a frame buffer in a programmable manner so as to allow independent control over the buffer areas accessed for read and write operations.

It is another object of this invention to provide a method and apparatus for providing flexibility as to allow varying uses of a given buffer area for functions in each of a plurality of windows.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF THE PREFERRED EMBODIMENTS

Figure 1:
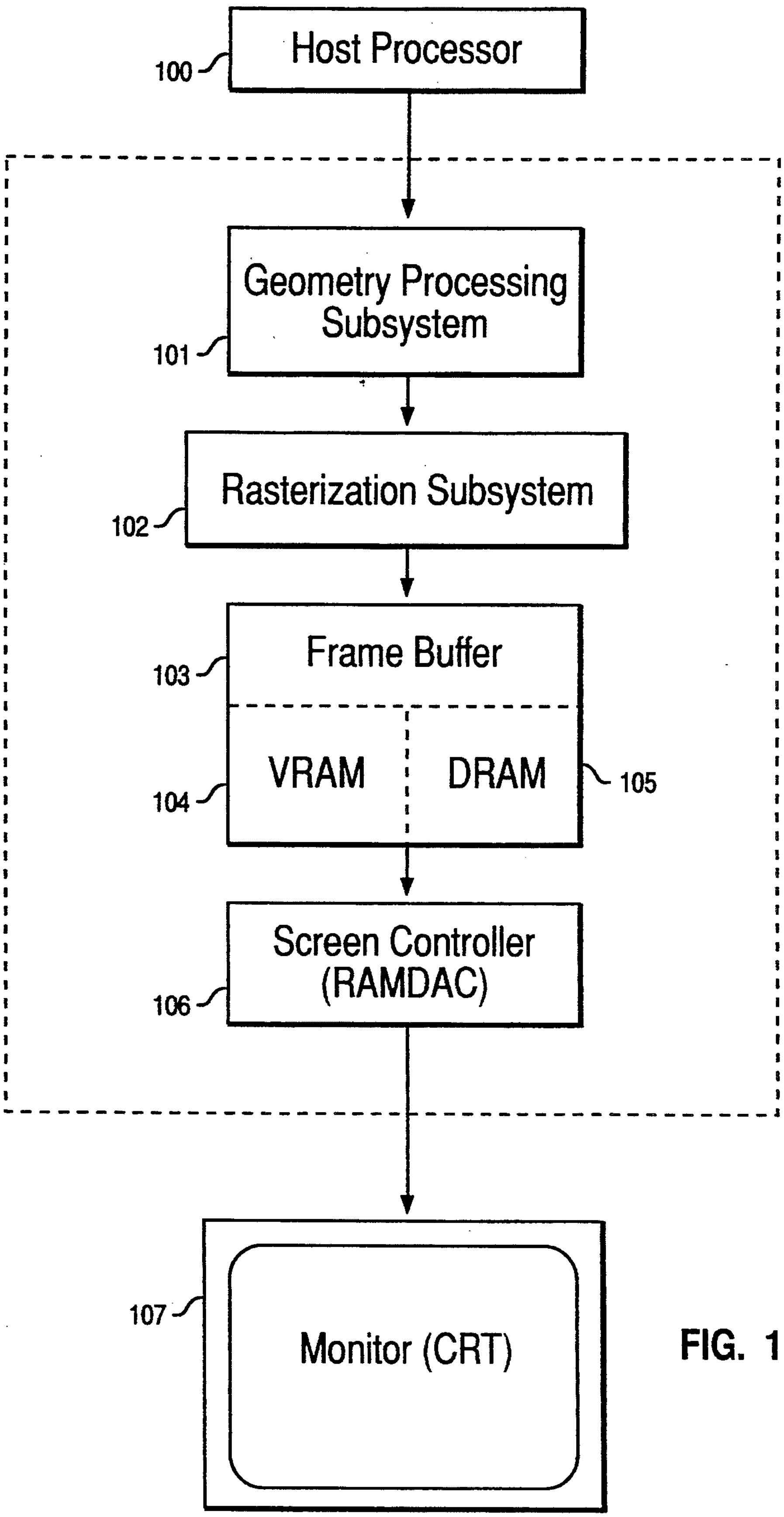
FIG. 1 is a block diagram illustration of a graphics system structure.

A graphics system is shown schematically in FIG. 1, Geometry processor subsystem 101 is responsive to geometric data X, Y, Z, and color data received from host processor 100 and applies transformations. Host processor 100 may be any computer engine that is capable of supplying data to the graphics adapter (elements 101–106), for example, a RISC System/6000® workstation. (RISC System/6000 is a registered trademark of IBM Corporation.) Geometry processor 101 creates a modified data stream of vertices to rasterization subsystem 102. Rasterization subsystem 102 is responsive the vertex data (position, color, and other rendering attributes) and generates values for the appropriate pixels. For example, two vertices define a line, and rasterization subsystem 102 generates the pixels that lie between the vertices. As another example, three vertices define a triangle, and rasterization subsystem 102 generates the interior pixels of the triangle.

Rasterization subsystem 102 generates pixel data and stores the generated pixel data in a frame buffer 103. Frame buffer 103 consists of a plurality of Video Random Access Memory (VRAM) devices 104 and Dynamic Random Access Memory (DRAM) devices 105 for storing the attributes of the pixels. VRAMs and DRAMs are common memory devices well known in the art; a VRAM differs from a DRAM primarily in that it has a serial data port in addition to the usual random access port.

VRAMs 104 of frame buffer 103 generally contain the pixel data that is associated with the viewed screen image, for example, the color data. The data from the serial port of each VRAM 104 is passed to screen control logic 106. In typical graphics applications, the screen is a cathode ray tube (CRT) monitor 107 and screen control logic 106 is a RAMDAC. A RAMDAC is a common application-specific integrated circuit (ASIC), consisting of a random access memory (RAM) lookup table driving one or more digital-to-analog converters (DACs) for the various color components, and is well known to those skilled in the art. Although CRT monitor 107 is depicted, any display or image storage device may be used within the scope of this invention. Other examples include plasma displays and NTSC video output.

DRAMs 105 are generally used to store those pixel attributes that are not displayed, for example, the Z-depth attribute or accumulation buffers.

Figure 2:
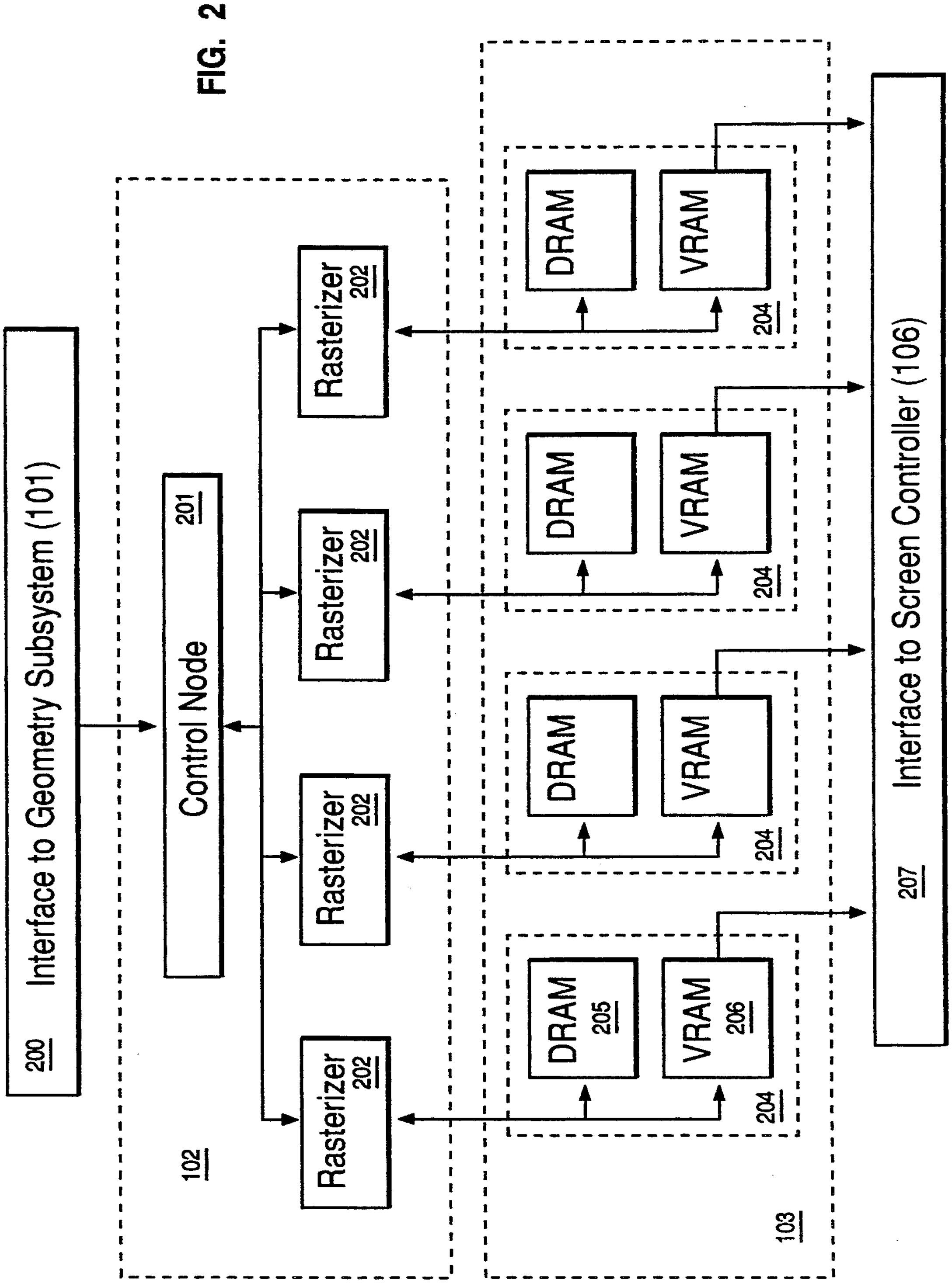
FIG. 2 is a block diagram illustration of one embodiment of a rasterization subsystem for the graphics system structure of FIG. 1.

A more detailed embodiment of the rasterization subsystem 102 is shown in FIG. 2. This embodiment comprises a multi-rasterizer system, however a single-rasterizer system is equally encompassed in the scope of the preferred embodiment. Similarly, the plurality of rasterizers depicted may be any number, not necessarily four. Data is fed from geometry processor subsystem 101 via interface 200 to control node 201, which is responsible for disseminating and distributing information to each of a plurality of rasterizers 202. In this embodiment, each rasterizer 202 is associated with a well-defined section of the screen. In particular, the embodiment described assumes that each of the four depicted rasterizers 202 controls every fourth vertical column of pixels in the displayable screen space. For example, the leftmost rasterizer 202 controls pixels whose X coordinate is 0, 4, 8, etc. Because of the well-defined mapping of the rasterizers 202 to screen coordinates, each rasterizer is attached to one portion (a quarter, in this instance) of the frame buffer 103. Each frame buffer portion 204 constitutes the memory required to maintain the pixel data for one rasterizer 202. As mentioned previously, the frame buffer 103 constitutes DRAMs 205 and VRAMs 206. VRAMs 206 are shown also being connected to the screen controller interface 207. This connection is made via the VRAMs' serial port, as is well known in the art. Although horizontal interleaving of the frame buffer is indicated above, other choices of frame buffer partitions are possible within the scope of the present invention.

Figure 3:
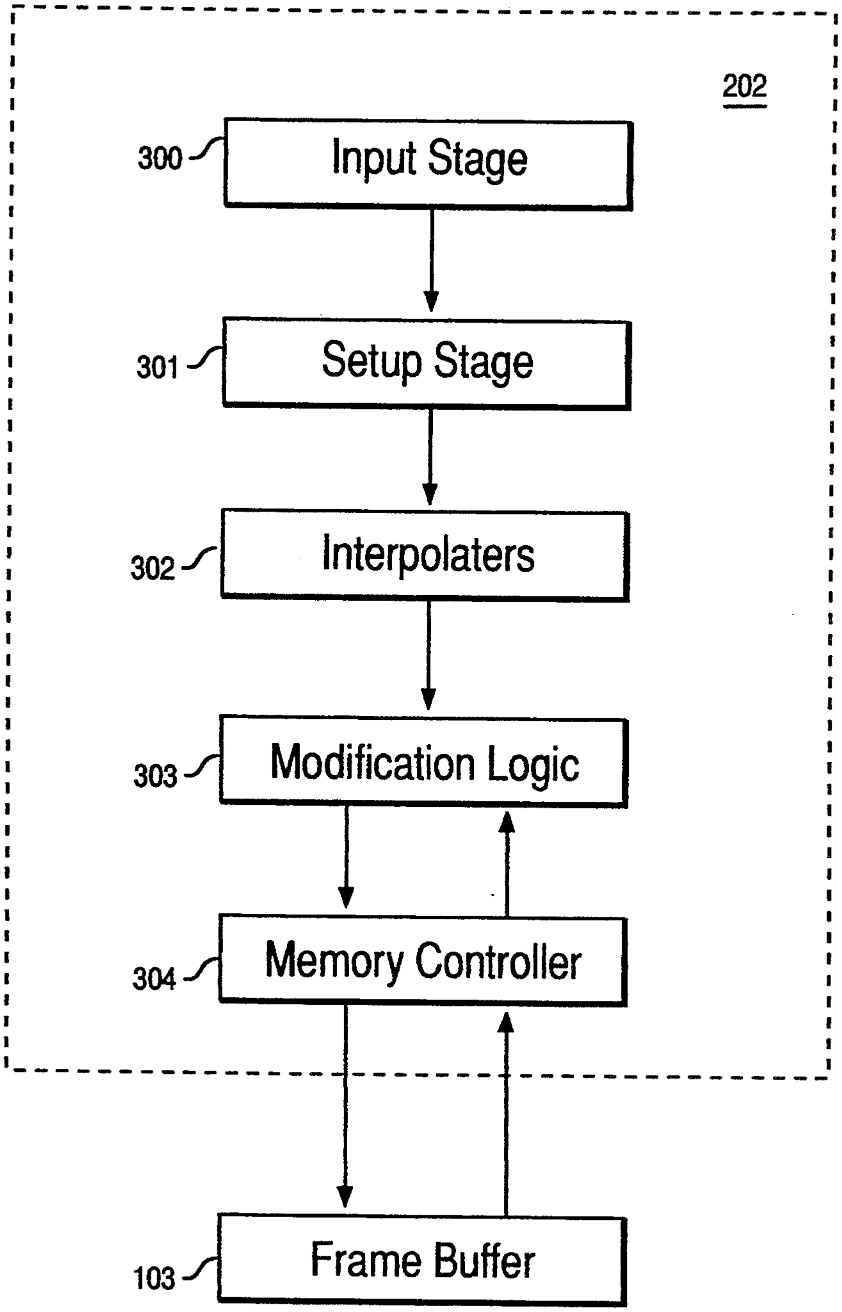
FIG. 3 is a block diagram illustration of one embodiment of a rasterizer for the rasterization subsystem of FIG.

FIG. 3 illustrates one embodiment of rasterizer 202. Data is received by input stage 300. Once vertex information for a given primitive (point, line, or polygon) is received, setup stage 301 generates the parameters necessary for interpolators 302 to generate the intermediate values. In one embodiment, the interpolators 302 use the modified Bresenham procedure detailed in Gonzalez-Lopez et al. U.S. Pat. No. 4,805,116, and setup logic in setup stage 301 generates the deltas and error terms described therein. Interpolators 302 generate individual pixels consisting of (X,Y,Z) position, color, transparency, etc.

Modification logic 303 performs operations necessary to merge the pixels generated by interpolators 302 with the data currently in frame buffer 103. Modifications may take various forms. The merge operation may be a simple pixel-replace operation where the new pixel value overwrites the current pixel value in the frame buffer. Other merge functions include hidden surface removal where the Z value of the new pixel is compared with the current frame buffer value, and the new pixel is not rendered if it lies behind the pixel currently in the frame buffer. Still other merge operations affect the blending of the new color value and the old color value. A commonly used function is based on the new pixel's transparency (or alpha coefficient), the new color and the frame buffer color at the current pixel location. The equation is generally written as:

Color :=Alpha * Now_color+(1−Alpha) * Old_color

Other functions of the interpolated alpha and color, and the frame buffer value of the alpha and color are well-defined in the current state of the art.

The data is passed between modification logic 303 and the frame buffer 103 by memory controller 304. The memory controller 304 is responsive to commands from interpolators 302 that specify which pixels are touched by the current rendering primitive and to other commands passed from geometry processing subsystem 101 (FIG. 1) that specify which frame buffer resources must be read and written.

Figure 4:
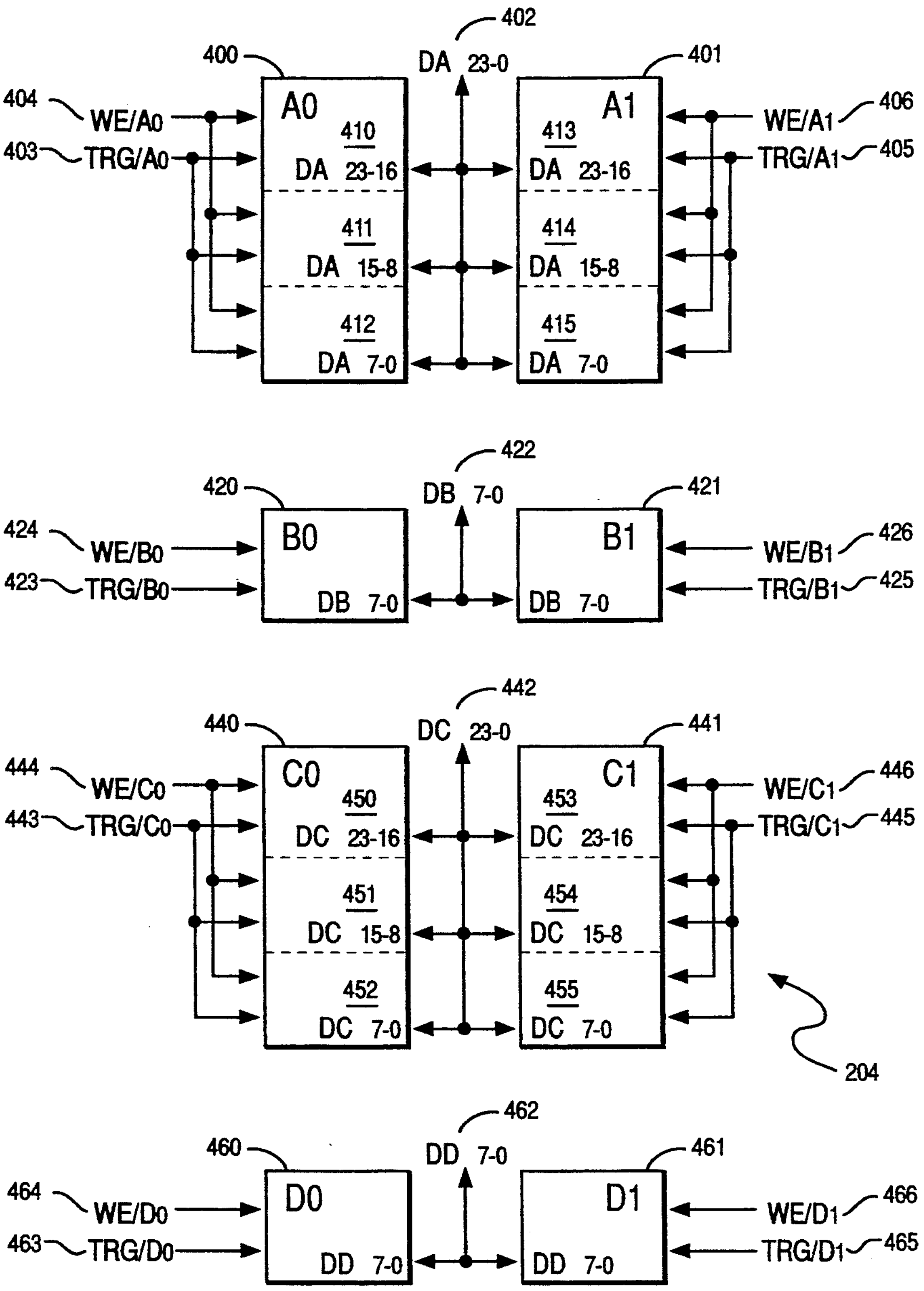
FIG. 4 illustrates one embodiment of how the frame buffer of FIG. 2 is controlled by the memory controller of FIG. 3.

FIG. 4 illustrates one possible embodiment of how a 128-bit-per-pixel frame buffer portion 204 may be connected to rasterizer 202 and controlled by memory controller 304. In this particular embodiment, rasterizer 202 is connected to its associated memory 204 via a 64-bit data bus. Clearly, other frame buffer configurations are possible having more bits or fewer bits per pixel and having wider or narrow interface buses. This particular embodiment is provided for illustrative purposes in order to clarify those aspects of the memory controller 304 affected by the present invention. Also, the memory devices depicted in FIG. 4 are not divided into DRAMs 205 and VRAMs 206. The control aspect of the present invention does not affect the connection of the serial port of VRAM 206, therefore all memory of frame buffer portion 204 may be considered as VRAM or DRAM without impacting the scope of the present invention.

For convenience, consider the screen size to which frame buffer 103 corresponds to be 1024×1024. Each memory module is a standard 2Mbit memory module having 512 rows, 512 columns and 8 bits of depth. Therefore, each memory module provides 8 bits of pixel depth for one-fourth of the pixels on the screen since, as depicted in FIG. 2, each frame buffer portion 204 represents one-fourth of the screen. It will be obvious to those skilled in the art that other mappings of memory to the screen and other screen sizes are possible. Such changes do not affect the scope of the present invention. For example, a common screen size is 1280×1024, and five 512×512 devices are used to store the screen image. Since, as shown in FIG. 2, each buffer portion 204 has its own rasterizer 202, there would be five rasterizers in this version for a 1280×1024 screen.

Additionally, the 2Mbit memory modules are assumed to be standard VRAM or DRAM devices responsive to -RAS, -CAS, -TRG/0E, -WE, and DSF control signals as is well known to those skilled in the art. When -RAS (Row Address Strobe) falls, that is, becomes active, a given row of the memory module as specified by the address bus is activated. Similarly, a specific column within the active row is selected based on the address bus when -CAS (Column Address Strobe) falls. If -TRG/OE (Trigger/Output Enable) is low, then the data in the selected row/column address is driven to the data port. -TRG/0E is hereinafter referred to as -TRG. This signal is also often referred to as -Of by those skilled in the art. If -WE (Write Enable) is low, then the data at the data port is written to the memory location selected by the current row/column address. The DSF (Designated for Special Function) signal allows for special functions of the memory to be activated. For example, DSF activates the block write function, which is used to quickly write a constant value under mask to a group of columnwise adjacent memory locations. Block write is a commonly provided function in standard VRAM devices and known to those skilled in the art.

Furthermore, FIG. 4 represents only one embodiment of how such a memory organization may be controlled. It will be apparent to those skilled in the art that other methods of controlling the memory depicted in FIG. 4 are possible. Some alternative control means will be suggested in the ensuing description. The 128 bits per pixel of memory illustrated in FIG. 4 require 16 2Mbit memory devices (16×8 is 128). In this embodiment of frame buffer segment 204, each bit of the 64-bit bus is connected to two memory devices. The data bus is separated into 4 segments: 24-bit segment DA (402), 8-bit segment DB (422), 24-bit segment DC (442), and 8-bit segment DD (462). Obviously, other methods of segmenting the bus are possible. Data bus segment DA (402) is attached to buffer A0 (400) and A1 (401). One byte of bus segment DA (402) is attached to the random data port (hereinafter data port) of devices 410 and 413; another byte of bus segment DA (402) is attached to the data port of devices 411 and 414; the third byte of bus segment 402 is attached to the data port of devices 412 and 415. One of the buffers associated with bus segment DA (402)—buffer A0 (400) or A1 (401)—is selected by activating -CAS (which is common to all memories in this embodiment), and the associated -TRG (for a read operation) or -WE (for a write operation). For example, data from buffer A0 (400) is read when -RAS and -CAS are active and TRG/A0 (403) is low (active). Similarly, data is written to buffer A1 (401) when -RAS and -CAS are low and WE/A1 (406) is active (low). Although it is possible to simultaneously write both buffer A0 (400) and buffer A1 (401) by activating WE/A0 (404) and WE/A1 (406), it is not possible to simultaneously read both buffers because of contention for the common data bus.

The other bus segments are similarly connected to their respective buffers. Although several symmetries are implied by the depicted embodiment, these symmetries are not necessary. For example, there could be three buffers associated with bus segment DA (402), and only one associated with bus segment DC (442). As noted previously, other methods of control will be obvious to those skilled in the art. For example, instead of a single -CAS signal and multiple -TRG/-WE signals, each bus could have a single associated -TRG and -WE and a -CAS signal per connected buffer.

Figure 5A:
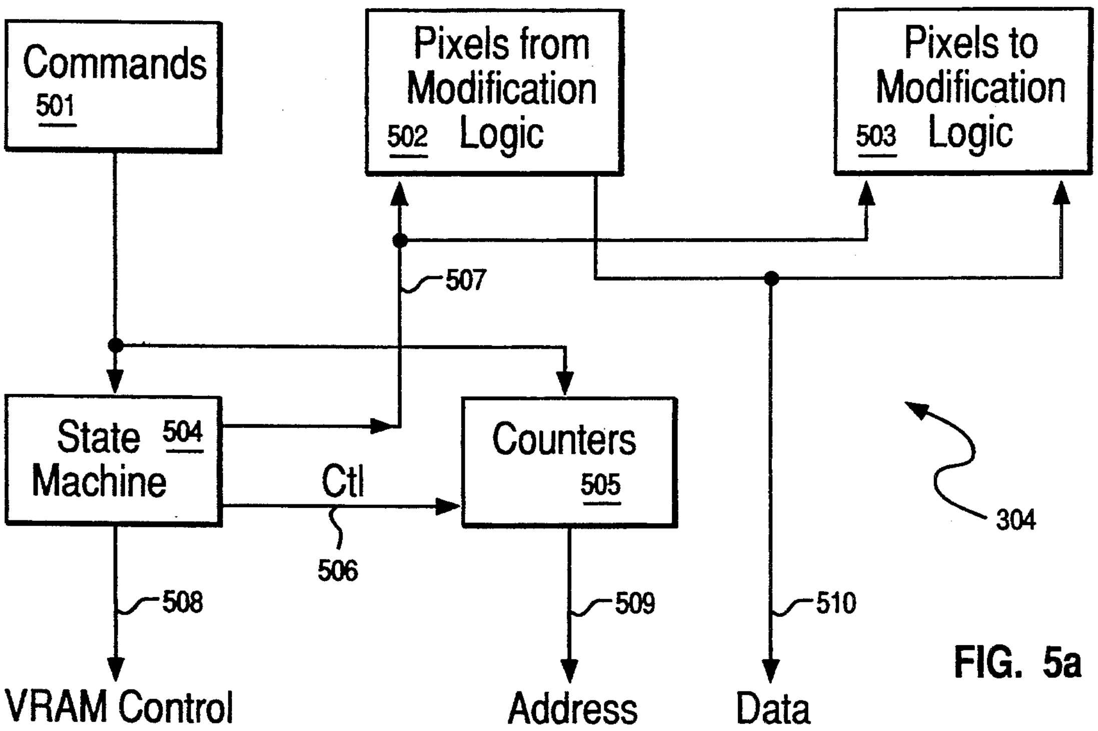
FIG. 5*a* is a block diagram illustration of one embodiment of the memory control logic utilizing the present invention in the memory controller of FIG. 3.

FIG. 5*a* illustrates one embodiment of memory controller 304. There are two main logic blocks associated with the memory controller. The first consists of position counters 505. Position counters 505 are used to track the current pixel position on the screen. In one embodiment, there are two pairs of XY position counters: one pair for the coordinates of the pixels being read and another pair for the coordinates of the pixels being written. The position counters may be initialized by commands passed from modification logic 303 via command interface 501. As pixels are read and written, the values of the position counters are augmented in accordance with parameters passed via commands. The second primary logic block is state machine 504. Like position counters 505, state machine 504 is responsive to commands passed via command interface 501. State machine 504 generates control signals responsible for controlling the following entities: memories within frame buffer 103, position counters 505, interface 502 from modification logic 303, and interface 503 to modification logic 303. State machine 504 consists of two primary blocks. First is a counter means (not depicted) that keeps track of the number of pixels to be read and/or written. Said counter means may consist of a plurality of counters. These counters are used to indicate when there are no more pixel accesses to be performed, i.e., the state machine may remain in its reset state. The second primary block of state machine 504 is the actual state machine, depicted in FIG. 5*b*.

Figure 5B:
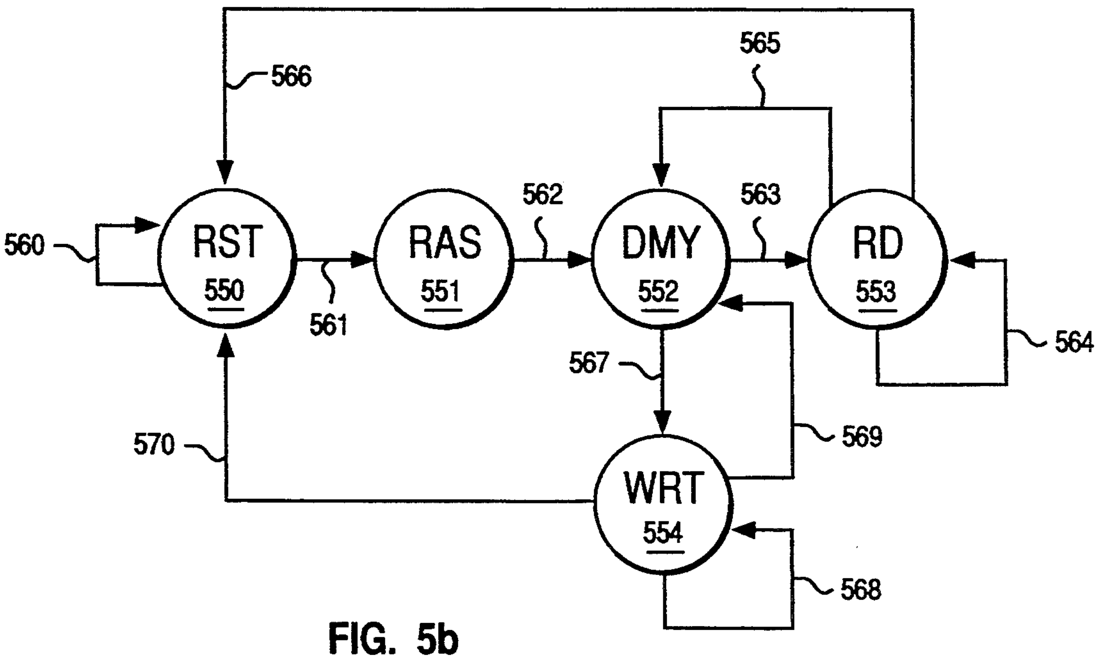
FIG. 5*b* is a logical state diagram of the state machine depicted in FIG. 5*a;*

Numerous implementations of state machine 504 are known to those skilled in the art. FIG. 5*b* illustrates the primary states of one embodiment. The present invention applies to the generation of control signals 506, 507, and 508 (all shown in FIG. 5*a*) and may be adapted to any state machine design.

Referring to FIG. 5*b*, state machine 504 nominally remains in RST 550 (reset). During this time, all control signals are inactive (high). Once a command is received that initiates reading and/or writing pixels, transition 561 is made to RAS 551 (RAS precharge). During this cycle control signals 506 are generated such that address bus 509 presents the proper row address for accessing the current pixel. At this time, -RAS is still high. Transition 562 is made during the next cycle to DMY 552 (dummy cycle). In this embodiment of state machine 504 dummy cycle 552 is necessary to satisfy the $t_{RCD}$ timing requirement of the memory, which specifies the minimum time from the falling edge of -RAS to the falling edge of -CAS; -RAS falls upon entering DMY 552 and one cycle is required prior to dropping -CAS in either RD 553 or WRT 554. If data is being read, the state machine makes transition 563 to RD 553 (read cycle). During read cycle 553, -CAS is pulsed (i.e., is made active for one clock pulse) and -TRG is active. Also, control signals 506 are set such that address bus 509 represents the column address of the pixel currently being read. Furthermore, RD state 553 generates control signals 507 such that interface 503 to modification logic 303 is loaded with the data read from the selected buffers. Once in RD state 553, control can continue along one of three paths. It may be necessary to return to RST 550 via transition 566 (for example, a row boundary is crossed and a new -RAS cycle must be performed). Dummy state 552 may be returned to via transition 565 if, for example, write cycles are to be performed in the same row address. Lastly, control may remain in read state 553 if, for example, there are more pixels to be read. Other reasons for making these transitions are apparent to those skilled in the art.

As previously noted, WRT state (write) 554 is entered when there are pixels to be written to frame buffer 103. During write state 554, -CAS is pulsed and -WE is low (active). Furthermore, control signals 506 is set such that the column address of the destination pixel is on address bus 509. Also, control signals 507 are set such that the data at the interface 502 from the modification logic 303 is popped and made available on data bus 510. As with read state 553, three transition options are possible from write state 554, and are made under similar circumstances.

Current memory controllers access frame buffer 103 in a well-defined inflexible fashion. For example, if both buffers CO (440) and C1 (441) (FIG. 4) are to be read, then buffer CO (440) is read first, followed by buffer C1 (441). This scheme fits well with the hard-coded algorithms performed by modification logic 303 present in rasterizers common in the art. The present invention relates to an improved memory controller providing the desired flexibility.

Figure 6:
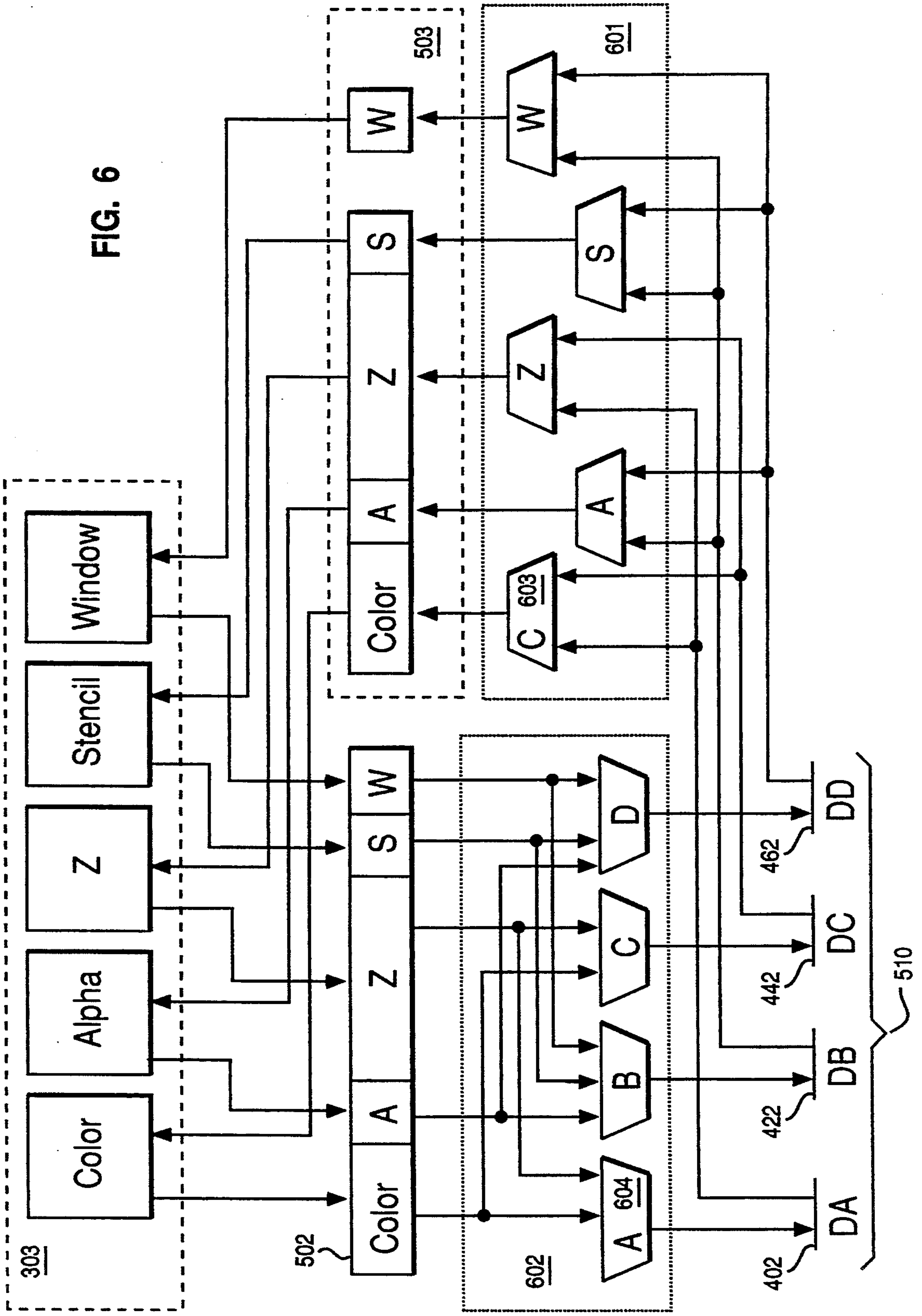
FIG. 6 illustrates the data paths of FIG. 5*a* necessary to implement the preferred embodiment of the present invention.

FIG. 6 illustrates the connection of the various segments DA-DD of data bus 510 to input interface 503 and output interface 502 of modification logic 303. Also depicted are the various modification units associated with the modification logic 303; in this embodiment, there are five modification units: color (C), alpha (A), Z, stencil (S) and window (W). Clearly more or fewer modification units are possible within the scope of the present invention. Output interface 502 has one output channel for each modification unit, while similarly, input interface 503 has one input channel for each modification unit.

As shown in FIG. 6, the data steering portion of memory controller 304 contains output steering logic 602 comprising multiplexers 604 and input steering logic 601 comprising multiplexers 603. Segments DA-DD of data bus 510 are coupled to the output channels of output interface 502 for write operations by output steering logic 602, which contains one multiplexer 604 (A-D) for each of the bus segments DA-DD. Bus segments DA-DD are coupled to the input channels of input interface 503 of modification logic 303 for read operations by input steering logic 601, which contains one multiplexer 603 (C, A, Z, S, W) for each of the corresponding input channels of input interface 503.

Figure 7:
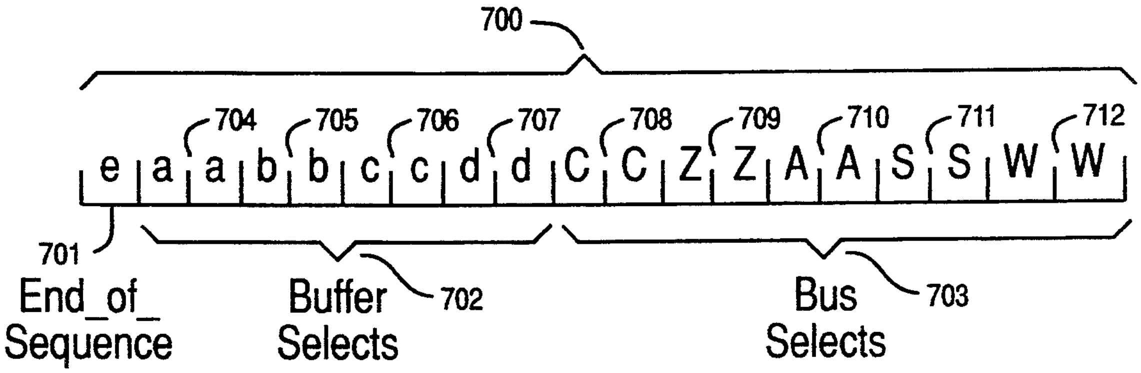
FIG. 7 is a diagram of the control word used to control the data paths depicted in FIG. 6 and generate the control signals to the frame buffer illustrated in FIG. 4.

Referring to FIG. 7, memory controller 304 is controlled by "picocode" consisting of one or more "picowords" 700, each of which contains three fields (701–703). The first field 701 is an end_of_sequence bit that allows for multi-cycle accesses with the picocode. When an access is requested, the current picoword is executed and the next sequential picoword is selected for the next access. This continues until end_of_sequence bit 701 is asserted, at which time the next word selected is the initial picoword. End_of_sequence bit 701 also indicates to state machine 504 that all requested buffer accesses for the current pixel have been completed and that the counter that maintains the number of pixels left to be processed may be decremented, and position counters 505 may be updated.

The second field 702 of picoword 700 consists of buffer select subfields 704–707, which determine the buffer or buffers A0-D1 (FIG. 4) that are accessed in a given cycle. In the preferred embodiment, each buffer A0-D1 of a frame buffer portion 204 (FIG. 4) is assigned one bit of field 702. For example, to access buffer A0 (400), the most significant bit (MSB) of the a-buffer select subfield 704 (the leftmost bit in subfield 704 of FIG. 7) is set, i.e., aa=B'10' (The "B" prefix indicates a binary value.) On the other hand, buffer A1 (401) is selected when a-buffer select subfield 704 is B'01'. The remaining bits of field 702 are used to select buffers B0, B1, C0, C1, D0, and D1, respectively.

In the preferred embodiment, buffer select field 702 is used to determine which -TRG or -WE signals (FIG. 4) are active during a read or write cycle, respectively. In addition, in the preferred embodiment, the controller 304 prevents two buffers on one bus from being read simultaneously. For example, if a picoword 700 used to specify a read access has a buffer select subfield 704 set to B'11', only one buffer, e.g., buffer A0 (400), is read. During write operations, specifying a pair of buffers (e.g., buffers A0 and A1) sharing a common bus segment causes the same data to be written to both buffers simultaneously.

The final field 703 in each picoword 700 consists of bus select subfields 708–712, which steer the accessed data to the appropriate input channels of input interface 503 during a read operation, and direct the data from the output channels of output interface 502 to the appropriate buses during write operations.

To accomplish this steering, multiplexers 603 of input steering logic 601 are controlled by the bits of bus select field 703. In the preferred embodiment, there is one subfield of bus select field 703 for each input channel of input interface 503. Since there are five such input channels in the circuit shown in FIG. 6, there are five subfields 708–712, as shown in FIG. 7. Each subfield has one bit for each bus segment DA-DD that may contribute data to the associated input channel of input interface 503. In the preferred embodiment, each input channel is connected to two bus segments. For example, the color input channel is connected to bus segments DA (402) and DC (442), as is the Z input channel. Similarly, the alpha, stencil and window input channels are connected to bus segments DB (422) and DD (462). There are thus two possible bus segments that may be alternatively connected to each of the five input channels (C, A, Z, S, W), for a total of ten connection combinations of bus segment and input channel. In all, therefore, ten bits are defined. An example of the control of multiplexer **603*c* (the leftmost multiplexer 603 in FIG. 6) by color bus select bits 708** is given in the following table:

| Color Bus Select | Bus Selected |
|---|---|
| B'00' | Color gets 0 |
| B'01' | Bus Segment DC |
| B'10' | Bus Segment DA |
| B'11' | Not Allowed |

As noted above, the disallowed bit combination B'11' may be interpreted to indicate a predetermined allowed operation, such as selecting bus segment DA (402). The control of multiplexer **603*z* by Z bus select bits 709 is similar, except that the selected bus is coupled to the Z input channel. The control of multiplexers 603*a*, 603*s* and 603*w* by respective alpha (A), stencil (S) and window (W) bus select bit pairs 710–712** is likewise similar, except that bus segment DB is chosen instead of bus segment DA and bus segment DD is chosen instead of bus segment DC.

The control of output steering logic 602 is similarly based on combinations of the subfields 708–712 of bus select field 703. Each multiplexer 604 of output steering logic 602 is controlled by those bits of bus select field 703 that select a given bus segment; there is one multiplexer per bus segment. Multiplexer **604*a* (the leftmost multiplexer 604 in FIG. 6), for example, selects the modified data written to bus segment DA (402). As indicated previously, for read operations bus segment DA (402) is selected by the most significant bits of color bus select subfield 708 and Z bus select subfield 709. These two bits (the MSBs of bus select subfields 708–709) are also used to control the multiplexer 604*a* feeding bus segment DA (402**) during write operations.

The definitions of the multiplexer control are slightly different for write cycles than for read cycles, however, as indicated below:

| DA Bus Select (C Z) | Modified Data Selected |
|---|---|
| B'00' | No data written to DA |
| B'01' | Z Data Written |
| B'10' | Color Data Written |
| B'11' | Not Allowed |

Bus segment DC (442) is controlled in a similar manner, except that the relevant bits are the least significant bits (LSBs) of subfields 708 and 709. Bus segment DB (422) is controlled in a similar manner by the MSBs of subfields 710–712 (only one of which for a given picoword may be at logic level logic 1), while bus segment DD is controlled in a similar manner by the LSBs of subfields 710–712 (only one of which may likewise be at logic level 1).

Figure 8A:
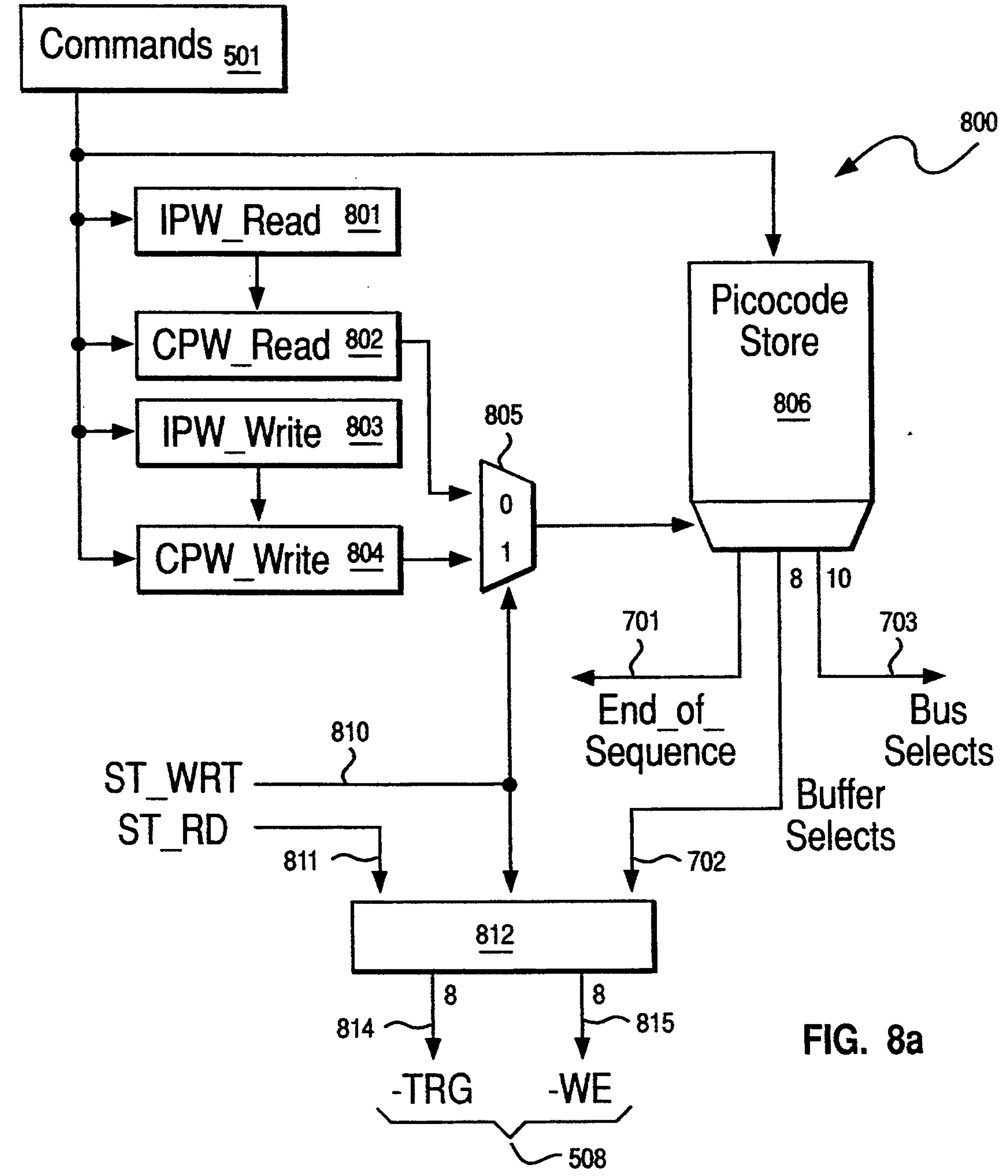
FIG. 8*a* illustrates the sequencer controller used in implementing the preferred embodiment of the present invention.

FIG. 8*a* illustrates the picocode controller 800. The controller 800 is responsive to signals from state machine 504 (FIG. 5*a*) and generates the -TRG and -WE signals 508 to the frame buffer 103. These signals are generated by the picocode because in the frame buffer portion 204 depicted in FIG. 4, the -TRG and -WE signals are used to select which buffer A0-D1 is accessed. In another embodiment of frame buffer 103, -CAS may be used in conjunction with -TRG and -WE to select a specific buffer, in which case the picocode controller 800 also generates -CAS. More than one picoword may define the accesses for one pixel, and separate sequences may be defined for read and write operations. For example, a given pixel update function may require reading from Z and window buffers (the latter buffer containing the ID of the active window for each pixel) and writing to color and Z buffers.

An addressable picoword store 806 contains a plurality of picowords 700 (FIG. 7). Separate register pairs 801–802 and 803–804 are maintained for addressing picoword store 806 during read and write operations. These registers are initialized by a "set initial picoword" command that loads the current read and write address registers 802 and 804 as well as the initial read and write address registers 801 and 803. When the read or write addresses are initialized, the initial address registers 801 and 803 and current address registers 802 and 804 are all loaded. The address that indexes picotode store 806 is selected by multiplexer 805 based on the current state of state machine 504 (FIG. 5*a*). When state machine 504 reaches write state 554 (FIG. 5*b*), ST-WRT signal 810 is asserted and the picoword selected by the current picoword address for writes (register 804) is executed. If the end_of_sequence bit 709 of the current picoword 700 is not set, then current address register 804 is incremented. If the end_of_sequence bit 701 is set, the initial write value (register 803) is copied into the current write address register 804. The control of the read address is handled in an analogous fashion. Although the preferred embodiment only supports incrementing or resetting the picoword address registers 802 and 804, a more general branching scheme is possible.

Figure 8B:
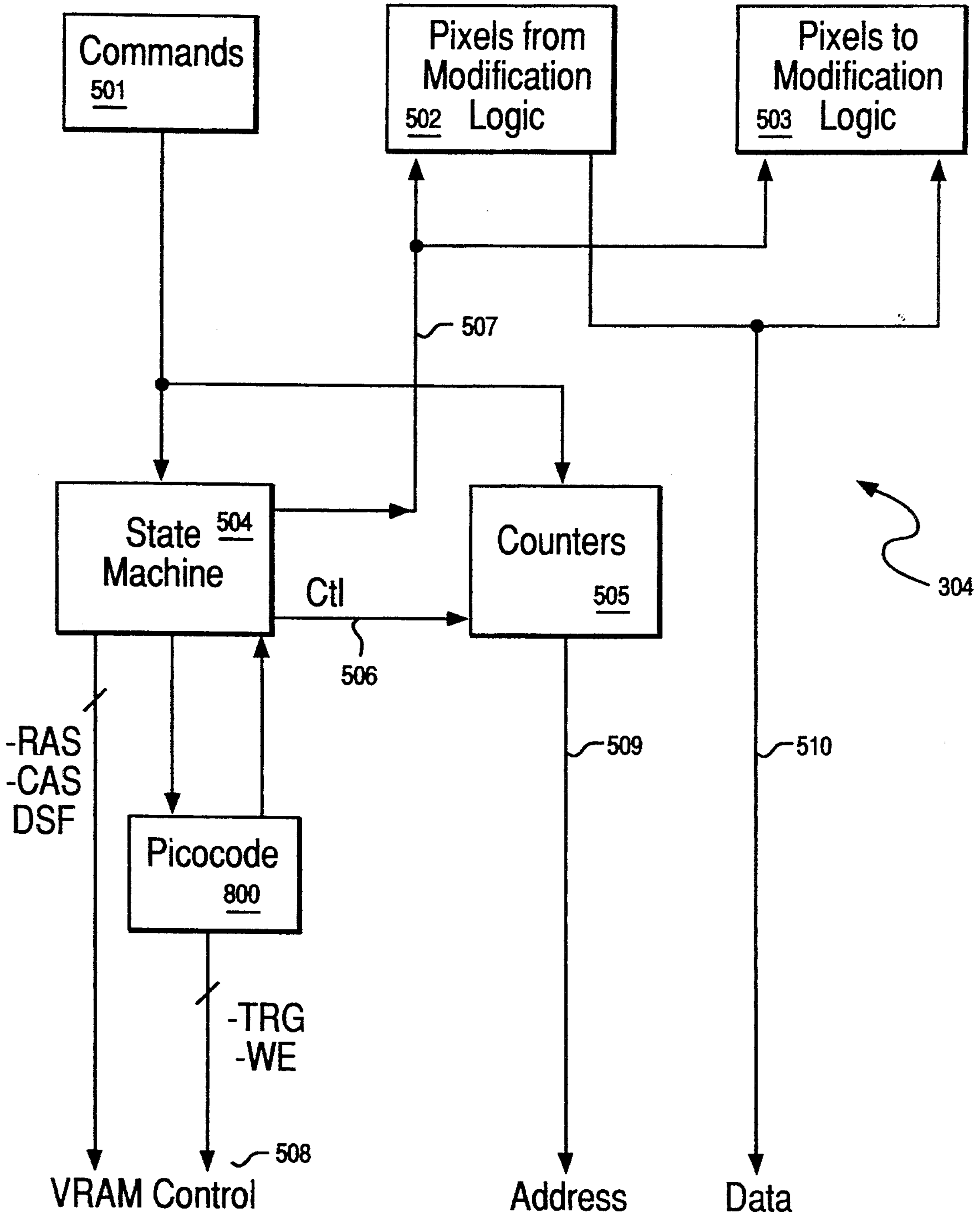
FIG. 8*b* is a block diagram illustrating the position of the sequencer controller relative to the other portions of the memory controller.

Referring to FIGS. 8*a* and 8*b*, buffer select bits 702 are combined with the current state signals 810 and 811 in logic block 812 to generate the -TRG portions 814 and -WE portions 815 of VRAM control signals 508. In the preferred embodiment, state machine 504 is still responsible for generating -RAS, -CAS and DSF portions of VRAM control signals 508. -CAS is asserted whenever ST RD line 811 or ST_WRT line 810 is active, -RAS is active except during RST (550) and RAS (551) states. As previously mentioned, DSF is generated based on the type of cycle being performed and the current state. -TaG signals 814 are asserted appropriately based on buffer select bits 702 when ST_RD 811 is asserted. Each buffer select bit 702 corresponds to one -TRG signal. The 'a' buffer select bits 704 (FIG. 7) control TRG/A0 (403) and TRG/A1 (405) (FIG. 4), and so on. Similarly, when ST_WRT (810) is asserted, -WE signals corresponding to buffer selects 702 are active (low).

Bus select bits 703 are used to control input steering logic 601 and output steering logic 602 (FIG. 6) as described above. Although in the above embodiment bits are defined that directly control the multiplexers 603 and 604, the control signal may alternatively be generated from a decode of bits in the picoword 700.

The normal operation of state machine 504 is augmented in a simple fashion upon implementation of the present invention. When either read state 553 or write state 554 is active (FIG. 5*b*), the appropriate signal (ST_RD 811 or ST_WRT 810, respectively) is sent to the picocode controller 800 (FIG. 8*a*). The buffer data is accessed in accordance with the control fields 702 and 703 specified by the current picoword 700, as described above. The counters in state machine 504 that track of the number of pixels to be read and written are decremented after a picoword 700 with the end_of_sequence bit 701 set is executed. For example, if two picowords 700 are specified for the read sequence, the number-of-pixels-to-be-read counter is decremented every second read cycle. Furthermore, position counter control signals 506 (FIG. 5) are asserted only when the picocode indicates an end_of_sequence condition. The control signals 507 to the interface units 502 and 503 (also FIG. 5*a*) are not affected by the presence of picocode.

Figure 9:
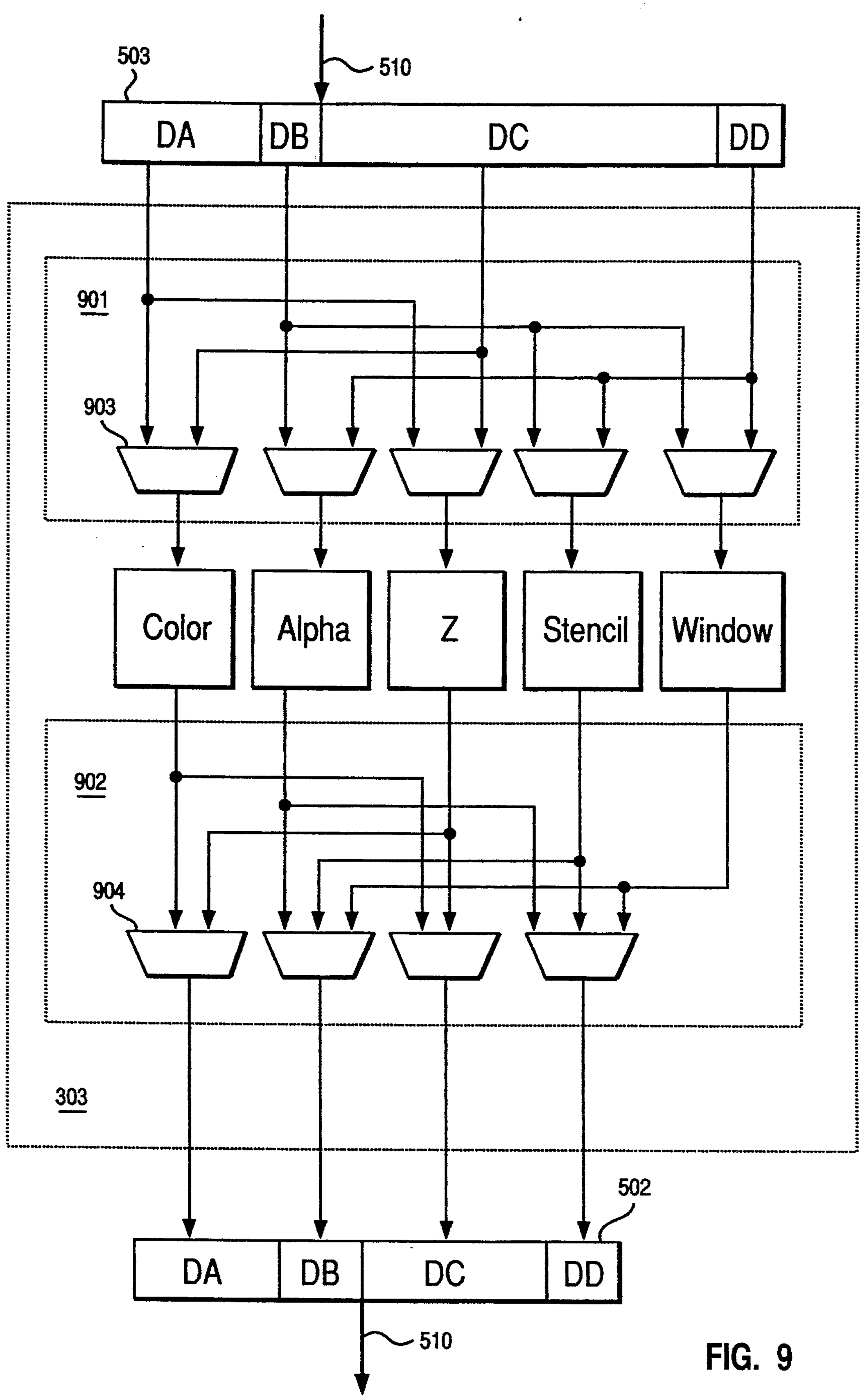
FIG. 9 is a block diagram of an alternative embodiment of the present invention in which the steering logic is part of the modification logic.

The preferred embodiment is not the only possible implementation of the present invention. A second embodiment is depicted in FIG. 9. In the second embodiment, bus select bits regulate a controller that is internal to modification logic 303. In this internal controller, input steering logic 901 containing multiplexers 903 couples input interface 503 to the modification units (C, A, Z, S, W), while output steering logic 902 containing multiplexers 904 couples the modification units to output interface 502. In this embodiment, data bus 510 connects directly to interfaces 502 and 503. The bus steering is performed by a programmable sequencer (referred to herein as "nanocode") in modification logic 303, similar to the picocode sequencer already described. In the most general case, the nanocode may contain control signals for specifying the operations performed by the modification units, as well as steering control signals (field 703 in FIG. 7). In this embodiment, the steering control signals are included in the "nanowords" making up the nanocode.

Although this alternative embodiment still contains a memory controller 304, that memory controller now need not contain steering logic 601—601, since the steering functions are being performed by the steering logic 901 and 902 internal to modification logic 303. The picowords of such a memory controller would contain field 701 for sequencing control and field 702 for buffer selection, but would omit the bus select field 703. Such a bus select field, together with a end_of_sequence bit for sequencing control, would instead appear in the nanocode regulating the controller internal to modification logic 303.

The alternative embodiment has an advantage over the preferred embodiment in that the interface logic 502 and 503 need be only as wide as data bus 510. Another advantage of this embodiment is the lack of additional logic between interface logic 502 and 503 and data bus 510; this reduces the time spent steering the data and increases the margin for the memory access timing. On the other hand, the preferred embodiment has the advantage that the modification logic control is not dependent on the location of the buffer being operated upon.

Figure 10:
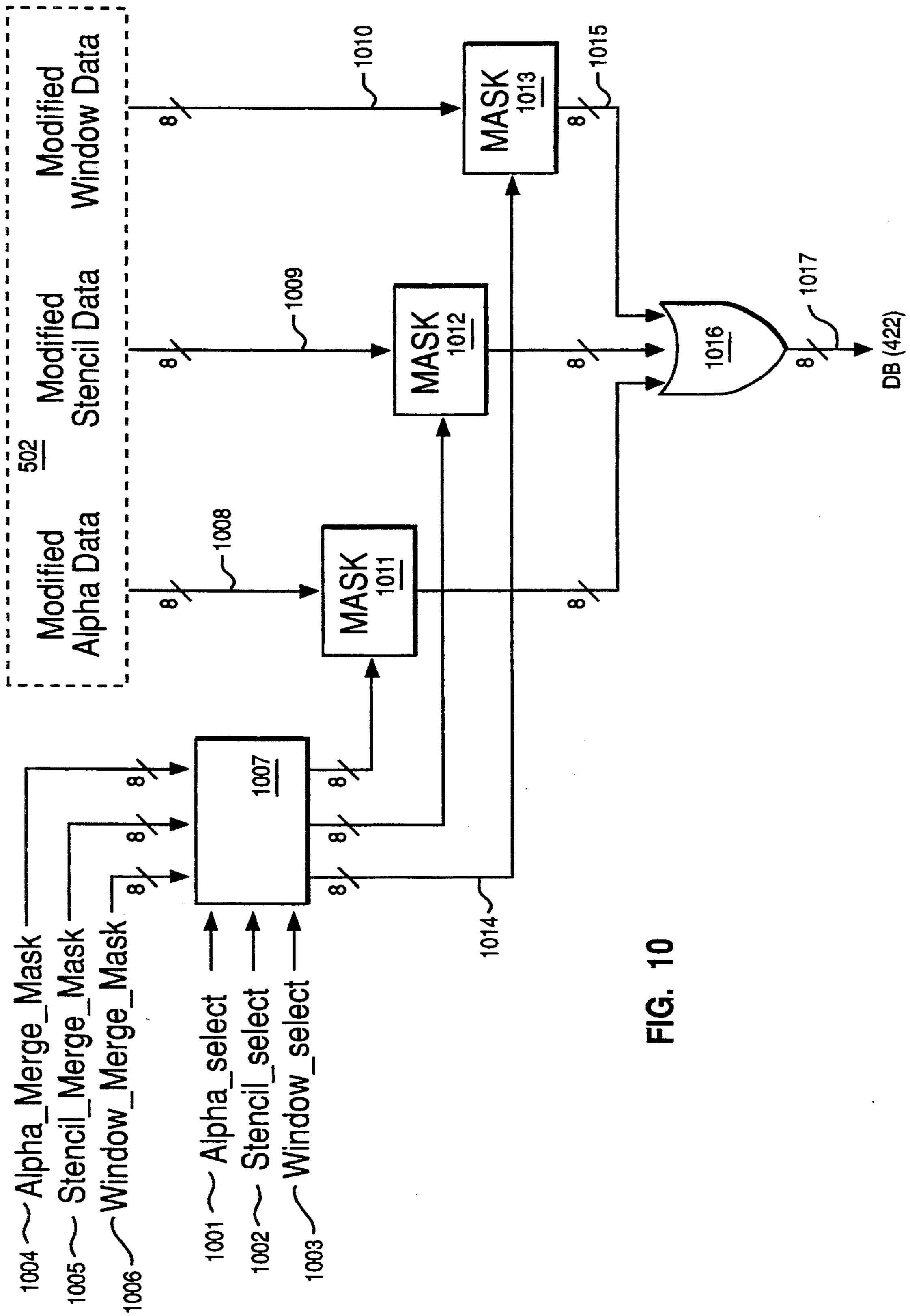
FIG. 10 is a block diagram of another alternative embodiment of the present invention in which nanocode or picotode instruction words are used to control the masking of the data paths from the modification logic.

It is further contemplated that the present invention may provide a means and apparatus for combining the data from multiple functions in a single buffer. For example, an application may require only 4 bits of alpha data and 4 bits of stencil data, and desire to store the 8 bits in a single 8-bit buffer such as buffer B0 (420). FIG. 10 illustrates how the preferred embodiment depicted in FIG. 6 may be augmented to allow, for example, the alpha and stencil to coreside in one 8-bit buffer. The logic depicted in FIG. 10 replaces multiplexer 604*b* of output steering logic 602 (FIG. 6). Similar logic is used to replace the remaining multiplexers 604 in a manner that is apparent to those skilled in the art.

In the portion of the preferred embodiment depicted in FIG. 10, the modified data that may be passed to data bus segment DB (422) may come from alpha, stencil, or window. Alpha_select 1001 is the most-significant bit of bus select 710—the bus select associated with data bus segment DB (422). Similarly, stencil_select 1002 is the MSB of bus select 711, and window-select 1003 is the MSB of bus select 712 (see FIG. 7). The present invention makes use of "merge masks" to specify which bits from each channel of modified data from output interface 502 are used to generate the final result 1017. In one embodiment, the masks are loaded in registers as static values. Another embodiment may have bits added to picoword 700 (FIG. 7) that select from a plurality of merge mask registers (not depicted).

For the logic depicted in FIG. 10, three merge masks are supplied—alpha 1004, stencil 1005, and window 1006. Merge masks are also defined for color and Z data (not depicted) where appropriate. The merge masks are combined with data selects in logic block 1007 to generate the masks for mask units 1011, 1012, and 1013. The mask logic units (1011, 1012, and 1013) perform a bitwise AND between their associated mask and input bus. Logic block 1007 applies the following rules to each merge mask:

1. The output is zero (X'00') if the associated data is not selected;
2. The output is ones (X'FF') if only tile associated data is selected;
3. The merge mask is passed unaltered otherwise.

For example, the mask 1014 associated with modified window data is forced to X'00'when window-select 1003 is B'0', indicating that modified window data 1010 is not passed to data bus segment DB 422. Mask 1014 is forced to X'FF' when only window_select 1003 is alpha_select 1001 and stencil_select 1002 are both B'0'. Window_merge_mask 1006 is steered to mask 1014 when modified window data 1010 and at least one other modified data value are selected, for example, when window_select 1003 and alpha_select 1002 are both B'1'. The masks used for stencil mask unit 1012 and alpha mask unit 1011 are generated in an analogous fashion.

The masked modified data (e.g., bus 1015) may be combined to form output 1017 by performing a bitwise OR (logic 1016) of the three busses. For example, if mask 1014 is X'00', then all bits of bus 1015 are zero and will not affect the value of bus 1017. The mask values are only B'1' for those bits that are selected to be part of output data 1017. When only one source is selected, the mask associated with the selected data is X'FF', and all bits of the modified data are passed to output bus 1017.

This is only one method of implementing the merging function defined above. Other methods of combining the modified pixel data may be implemented in either memory controller 304 or modification logic 303 within the scope of the present invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A memory controller for a computer graphics system for converting graphic primitives into a two dimensional array of pixel data for display on a display device, said pixel data having a plurality of bits for each pixel, said graphics system including means for generating a first plurality of pixel attributes each having one or more bits, said means for generating accepting as input a second plurality of pixel attributes, the controller comprising:

means for storing said two dimensional pixel array, said storage means having one or more data access ports;

means for connecting said means for generating to one of said data access ports of said means for storing, said means for connecting having a plurality of segments each corresponding to a subset of said plurality of bits stored for a pixel in said means for storing; and means responsive to a control signal for coupling selected ones of said first or second plurality of pixel attributes to selected segments of said means for connecting.

2. The system of claim 1 in which said coupling means comprises means for accessing instruction word and means for coupling said plurality of attributes to said segments in accordance with said instruction word.

3. The system of claim 1 in which said coupling means comprises means for accessing a stored sequence of instruction words, means for sequencing through said instruction words, and means for coupling said plurality of attributes to said segments in accordance with the currently accessed instruction word.

4. The system of claim 3 in which said instruction words contain a field indicating the end of a current sequence, said sequencing means being responsive to a value of said field to alter the sequencing through said instruction words.

5. The system of claim 4 in which said sequencing means comprises a current address register for storing an address of the current instruction word and means responsive to said field indicating the end of a current sequence for loading a new address into said current address register.

6. The system of claim 1 in which said means for storing has a plurality of memory devices attached to said means for connecting.

7. The system of claim 6 in which said coupling means is responsive to said control signal to enable selected memory devices attached to said means for connecting.

8. In a computer graphics system in which graphics primitives are converted to a two-dimensional array of pixel data for display of a pixel image, a method for processing said pixel data comprising the steps of:

(a) generating said pixel data for the pixels making up said array, said pixel data having a plurality of bits per pixel grouped into a plurality of attributes;

(b) storing the generated pixel data in a memory means, said memory means storing a plurality of bits per pixel and having one or more data access ports, at least one of said ports being divided into segments each corresponding to a subset of said plurality of bits per pixel; and (c) in response to a control signal, coupling selected attributes to selected segments of one of said data access ports in accordance with said control signal to provide said generated pixel data to said memory means.

9. A memory controller for a graphics processing system having one or more pixel modification processors that read and write pixel attributes, said pixel attributes being stored in a storage means having one or more data access ports, the system comprising:

control means for specifying a buffer location in said storage means for each pixel attribute;

means for linking said one or more pixel modification processors to said storage means, said means for linking divided into a plurality of data paths each connected to a buffer location in said storage means through one of said data access ports, said means for linking being responsive to said control means to link each of said plurality of data paths to said pixel attribute specified by said control means.

10. The system of claim 9 wherein said pixel attributes include color, transparency, z buffer, stencil and window.

11. The system of claim 9 wherein said means for linking comprises multiplexors controlled by said control means.

12. The system of claim 9 wherein said means for linking comprises a computer system bus.

13. The system of claim 12 wherein said computer system bus is 64 bits wide and is divided into four segments.

14. The system of claim 9 wherein said control means is a sequencer responsive to stored instruction words.

15. The system of claim 9 wherein said specified buffer to pixel attribute assignment varies for each of a plurality of windows defined for a display.

* * * * *